United States Patent [19]

Usuki et al.

[11] Patent Number: 5,707,742
[45] Date of Patent: Jan. 13, 1998

[54] MAGNETIC RECORDING MEDIUM COMPRISING A FERROMAGNETIC METAL THIN FILM, PROTECTIVE LAYER, AND AN ALKYLAMINE PERFLUOROPOLYETHER LUBRICANT

[75] Inventors: Kazuyuki Usuki; Toshio Ishida; Kunihiko Sano, all of Odawara, Japan

[73] Assignee: Fuji Photo Film Co., Ltd., Kanagawa, Japan

[21] Appl. No.: 541,970

[22] Filed: Oct. 10, 1995

[30] Foreign Application Priority Data

Oct. 7, 1994 [JP] Japan .................... 6-243596

[51] Int. Cl.$^6$ .................................................. G11B 5/66
[52] U.S. Cl. ............... 428/422; 428/457; 428/694 TP; 428/694 TF; 428/900
[58] Field of Search ............... 428/694 TF, 694 TP, 428/457, 421, 900, 422

[56] References Cited

U.S. PATENT DOCUMENTS

| | | | |
|---|---|---|---|
| 4,536,444 | 8/1985 | Somiya et al. | 428/340 |
| 5,091,269 | 2/1992 | Kondo et al. | 428/695 |
| 5,268,227 | 12/1993 | Nishikawa et al. | 428/336 |
| 5,374,480 | 12/1994 | Nishikawa et al. | 428/336 |
| 5,395,696 | 3/1995 | Ishida et al. | 428/408 |
| 5,431,833 | 7/1995 | Kondo et al. | 252/54.6 |
| 5,453,539 | 9/1995 | Kondo et al. | 562/586 |
| 5,498,457 | 3/1996 | Ishihara et al. | 428/65.4 |

FOREIGN PATENT DOCUMENTS 06124432  5/1994  Japan .

*Primary Examiner*—Stevan A. Resan
*Attorney, Agent, or Firm*—Sughrue, Mion, Zinn, Macpeak & Seas, PLLC

[57] ABSTRACT

The present invention provides a magnetic recording medium, which comprises a salt of a perfluoropolyether modified with phosphoric acid at molecular terminal and an alkylamine on a magnetic layer having a ferromagnetic metal thin film at least on one side of a non-magnetic support member or a protective film formed on the magnetic layer, and it shows excellent properties under any operating conditions including low temperature and low humidity.

2 Claims, No Drawings

MAGNETIC RECORDING MEDIUM COMPRISING A FERROMAGNETIC METAL THIN FILM, PROTECTIVE LAYER, AND AN ALKYLAMINE PERFLUOROPOLYETHER LUBRICANT

BACKGROUND OF THE INVENTION

The present invention relates to a magnetic recording medium having a ferromagnetic metal thin film as a magnetic layer, and in particular to a metal thin film type magnetic recording medium having excellent running property, durability and storage property by providing a lubricant of a specific structure on its protective film.

It is attempted to improve lubricating property and running durability between a magnetic recording medium and a magnetic head by coating a lubricant on the surface of a magnetic layer in a magnetic recording medium such as magnetic tape, floppy disk, etc.

In particular, with the technical progress toward high density recording, the surface of a magnetic layer is becoming more and more smooth in the magnetic recording medium, and the information recorded is usually stored from several years to several tens of years. For this purpose, there are strong demands on a medium having high running durability and storage stability under diverse environmental conditions, and conventional type lubricants cannot completely meet such requirements.

Further, small size video tape recorders such as camcorder or 8 mm video recorder are often used in outdoor applications, and the magnetic recording medium must have high performance characteristics to suit the use in wide range of environmental conditions.

To cope with the development of high definition television and with the improvement of magnetic recording density on video tape to match digitalization technique, much expectation is placed on a ferromagnetic metal thin film type magnetic recording medium, which uses ferromagnetic metal thin film suitable for high density recording as the magnetic layer. In this magnetic recording medium, the magnetic layer is simply protected by an oxide layer of very thin metal. It is necessary for the ferromagnetic metal thin film type magnetic recording medium not only to guarantee high running property and durability but also to provide a material for the lubricant layer, which can extensively improve the storage property.

Specifically, for the purpose of attaining high density recording in the ferromagnetic metal thin film type magnetic recording medium, it is attempted to smoothen the surface and to improve the composition of the magnetic layer from CoNi—O type to Co—O type or Co—Fe type including Co—O, i.e. toward the composition having higher coercive force (Bm) with Co as principal component. Despite of these efforts, it is still difficult to attain stable running property, durability and corrosion-resistant property by the use of the material with high cobalt content.

On the other hand, the ferromagnetic metal thin film type medium is used in practical application in disk type medium, of which hard disk is a typical example. In order to cope with the needs in the age of multi-media using information of large capacity, there are now strong demands on the improvement of magnetic recording density as well as magnetic tape. To improve the recording density, it is necessary to switch over from the currently used head floating CSS (contact stop start) type to the contact sliding type such as magnetic tape and to extensively reduce spatial loss between the head and the medium. In such a system, however, it is difficult to maintain durability with the protective film or the lubricant presently in use, and the material has not been found yet, which can satisfy the requirements for practical application.

As the lubricants for the ferromagnetic metal thin film magnetic recording medium, attention is focused on lubricants of hydrocarbon type or fluorine type, which provides excellent lubricating performance characteristics. In particular, it is known-that an organic fluorine compound having hydrophilic functional group in the molecule is capable to extensively improve the running durability.

However, even when a lubricant having excellent property is used, the lubricant attached on the magnetic layer is gradually lost due to repeated sliding operations on the smooth metal thin film type magnetic recording medium having improved electromagnetic transfer characteristics, and the characteristics of the medium are deteriorated.

In this respect, it is attempted to improve the characteristics by introducing a lubricant having various types of polar groups in the molecule. For this purpose, carboxylic acid ester, phosphoric acid ester, etc. for example are disclosed in JP-(A) 59-119537 or JP-(B) 4-50644, but there are still problems in that repeated running durability is still low at low temperature. To solve the problems, efforts have been made to improve the characteristics by simultaneous use of two types or more of lubricants.

Attempts have also been made to improve the characteristics by the use of perfluoropolyether, which provides high lubricating property at low temperature and low humidity conditions. However, perfluoropolyethers are not soluble in organic solvents, and it is necessary to use fluorine type solvent such as flon (chlorofluorocarbon), which is not very recommendable from the viewpoints of environmental protection or cost. To overcome the problem, it has been proposed in recent years to introduce alkyl chains into perfluoropolyether to make it solubilizable in organic solvents of hydrocarbon type as disclosed in JP-(A) 5-2737, for example. However, even when such lubricants are used, it is not yet possible to ensure high running durability and corrosion-resistant property in a magnetic recording medium which has high C/N ratio (carrier to noise ratio).

On the other hand, attempts have been made in recent years to improve durability and corrosion-resistant property by providing a protective film on the magnetic layer not only in magnetic disk but also on magnetic tape. Above all, attention has been focused on carbon film as represented by diamond-like carbon film, which has high hardness and is not easily seized on the sliding member under any conditions. However, even with such carbon protective film, friction coefficient increases due to repeated sliding operations and film is ruptured when only the carbon protective film is used. For this reason, it is generally practiced to coat a lubricant having polar group even on such protective films.

For example, JP-(A) 5-143975 discloses a magnetic recording medium, in which a salt of perfluoropolyether modified with a carboxylic group and amine is used on a carbon film. In this case, however, the problem of still durability caused by high-speed sliding of magnetic head and magnetic layer remains unsolved even though it is effective to reduce friction coefficient to the guide pole. There are also problems in that adsorption property to carbon film is not so high as the case of phosphoric acid group.

It is an object of the present invention to provide a magnetic recording medium, which has low and stable friction coefficient, high durability and good corrosion-resistant property suitable for high density magnetic recording.

SUMMARY OF THE INVENTION

To attain the above object, the magnetic recording medium according to the present invention comprises a magnetic film having a ferromagnetic metal thin film at least on one side of a non-magnetic support member, whereby a salt of a compound containing perfluoroether group modified with phosphoric acid at terminal and an alkylamine compound is present on the surface of said medium.

The magnetic recording medium of the present invention comprises a salt of a compound containing perfluoropolyether group modified with phosphoric acid group at terminal and an alkylamine compound, which is a compound expressed by either one of the following chemical formulae (1) to (4) or a mixture of these compounds:

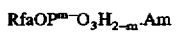  (1)

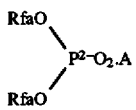  (2)

  (3)

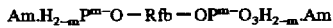  (4)

where A represents:

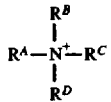

wherein $R^A$, $R^B$, $R^C$ and $R^D$ each represents a hydrogen atom or a hydrocarbon group or a hydrocarbon fluoride group having 1 to 26 carbon atoms, and B represents:

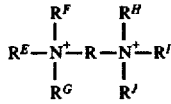

where $R^E$, $R^F$, $R^G$, $R^H$, $R^I$ and $R^J$ each represents a hydrogen atom or a hydrocarbon or a hydrocarbon fluoride group having 1 to 26 carbon atoms, and R represents an alkylene group having 1 to 26 carbon atoms.

M represents 1 or 2.

Rfa represents a monovalent perfluoropolyether modified with alkylene group at one terminal; and Rfb represents a bivalent perfluoropolyether modified with alklylene groups at both terminals.

DESCRIPTION OF THE PREFERRED EMBODIMENT

As the salt of perfluoropolyether modified with phosphoric acid group at terminal to be formed on the surface of the magnetic recording medium of the present invention, it is preferable to use a salt of phosphoric acid ester modified at one terminal or at both terminals of the perfluoropolyether of (1) or (3) and an alkylamine. This is because adsorption and orientation of the lubricant can be accomplished easily and high lubricating effect can be obtained.

The perfluoropolyether modified with phosphoric acid groups at terminals of the present invention can be synthesized by mixing a perfluoropolyether modified with phosphoric acid groups at terminals and an alkylamine and by heating the mixture to temperature higher than the melting point of the alkylamine, or by dissolving the two substances in a solvent and then by removing the solvent. Also, the perfluoropolyether with modified phosphoric acid group at terminal can be synthesized by heating and reacting a perfluoropolyether modified with hydroxyl group at terminal and a phosphoryl chloride in a mixture solution of organic solvents of hydrocarbon fluoride type or hydrocarbon type, and further by hydrolyzing.

In the perfluoropolyether modified with phosphoric acid at terminal, the polyether chain Rfa is a monovalent perfluoropolyether group modified with alkylene group at one terminal, and Rfb represents a bivalent perfluoropolyether group modified with alkylene groups at both terminals.

Here, the perfluoropolyether group is a group, which has perfluoromethyleneoxide polymer $(CF_2O)_n$, perfluoroethyleneoxide polymer $(CF_2CF_2O)_n$, perfluoropropyleneoxide polymer $(CF_2CF_2CF_2O)_n$, perfluoroisopropyleneoxide polymer $(CFCF_3CF_2O)_n$, or a copolymer such as perfluoromethyleneoxide-perfluoroethyleneoxide copolymer $(CF_2O)_m$—$(CF_2CF_2O)_n$ as main chain and has an alkylene chain $(CH_2)_p$ at terminal.

Its molecular weight is preferably from 1,000 to 5,000, or more preferably from 1,500 to 3,000. If molecular weight is too low, lubricating property at low temperature and low humidity conditions specific to the perfluoropolyethers is not sufficiently high. If molecular weight is too big, it is not desirable because it leads to lower solubility in organic solvents or to increase of static friction coefficient.

On the other hand, $R^A$, $R^B$, $R^C$ and $R^D$ in the alkylamine (Am) each represents a hydrogen atom or a hydrocarbon group or a hydrocarbon fluoride group having 26 carbon atoms or less, and m is 1 or 2. It is preferable that the hydrocarbon group is a straight chain saturated hydrocarbon group, but it may contain an unsaturated hydrocarbon group or a hydrocarbon group of branched structure with a side chein or a linking group, or it may be a hydrocarbon fluoride group with a part or all of hydrogen atoms substituted by fluorine atoms. These substances need not be identical with each other, and at least one of R's is preferably a hydrocarbon group having 8 to 26 carbon atoms, or more preferably the other hydrocarbon group has 3 or less carbon atoms or is a hydrogen atom. If the number of carbon atoms is less than this, good lubricating property and protective effect cannot be obtained. During repeated sliding, friction coefficient is increased. If there are too many carbon atoms, crystalizing property increases, and lubricating effect is decreased due to the reduction of coating ability, and this is not desirable.

In the alkylamine B, $R^E$, $R^F$, $R^G$, $R^H$, $R^I$ and $R^J$ each represents a hydrogen atom or a hydrocarbon group having 26 or less carbon atoms or a hydrocarbon fluoride group. The hydrocarbon group is preferably a direct chain saturated hydrocarbon group, while it may contain an unsaturated hydrocarbon group or may be a hydrocarbon group of branched structure with a side chain and a linking group introduced in it, or it may be a hydrocarbon fluoride group with a part or all of hydrogen atoms substituted by fluorine atoms. These substances need not be identical with each other, and at least one of R's is preferably a hydrocarbon group having 8 to 26 carbon atoms, and the other hydrocarbon group has 3 or less carbon atoms or is a hydrogen atom. Further, one of $R^E$, $R^F$ or $R^G$, or one of $R^H$, $R^I$ or $R^J$ is preferably a hydrocarbon group having 8 to 26 carbon atoms, and the other hydrocarbon group has 3 or less carbon atoms or is a hydrogen atom. If the number of carbon atoms is fewer than this, good lubricating property and protective effect cannot be obtained, and friction coefficient is increased during repeated sliding. On the contrary, if there are too many carbon atoms, crystalizing property increases, and lubricating effect is decreased due to the reduction of coating ability, and this is not desirable.

As the salt of perfluoropolyether modified with phosphoric acid at terminal and alkylamine compound as usable in the magnetic recording medium of the present invention, the following substances may be used:

$F(CF_2(CF_3)CF_2O)_nCH_2OPO_3H \cdot H_3NC_{18}H_{37}$ $F(CF_2CF_2CF_2O)_nCH_2OPO_3H \cdot H_3NC_{18}H_{37}$ $F(CF_2CF_2CF_2O)_nCH_2OPO_3H \cdot H_3NC_{12}H_{25}$ $F(CF_2CF_2CF_2O)_nCH_2OPO_3H \cdot HN(CF_3)_2C_{18}H_{37}$ $F(CF_2CF_2CF_2O)_nCH_2OPO_3 \cdot (H_3NC_{18}H_{37})_2$ $F(CF_2CF_2CF_2O)_nCH_2OPO_3H \cdot H_3N(CH_2)_{10}NH_3 \cdot HO_3POCH_2(OCF_2CF_2CF_2)_nF$ $F(CF_2CF_2CF_2O)_nCH_2OPO_3H \cdot H_3N(CH_2)_{18}NH_3 \cdot HO_3POCH_2(OCF_2CF_2CF_2)_nF$ $C_{18}H_{37}NH_3 \cdot HO_{POCH2}CF_2(CF_2CF_2)_n(CF_2O)_mCF_2CH_2OPO_3H \cdot H_3NC_{18}H_{35}$ $C_{12}H_{25}NH_3 \cdot HO_3POCH_2CF_2(CF_2CF_2O)_n(CF_2O)_mCF_2CH_2OPO_3H \cdot H_3NC_{12}H_{25}$ As the method to provide the salt of the perfluoropolyether modified with phosphoric acid group at terminal and alkylamine on the surface of the magnetic recording medium of the present invention, a method to dissolve the above lubricant in an organic solvent and to coat it or a method by vacuum evaporation may be used. In the solution coating method, the solution may be coated by wire bat coating method, gravure coating method, spray coating method, dip coating method, spin coating method, etc.

Further, in case the magnetic recording medium is a magnetic tape, it is most preferable to adopt the method to form a back-coat layer containing the above lubricant on the back surface of the support member and to transfer the lubricant on the back-coat layer to the surface of the magnetic layer by winding it up. This is because it is mote advantageous to maintain mote lubricants on the back-coat layer, which has far more pores than ferromagnetic metal thin film or protective film and also because the lubricants can be supplied by winding up while it is lost by sliding. When a fluorine-containing compound is coated on a magnetic layer, a slight unevenness in coating or deposition of compound may occur when dried after coating even when the compound is soluble in organic solvent. However, in the method to transfer from the back-coat layer, the lubricant comprising a fluorine-containing fatty acid ester compounds is mixed in or coated on the back-coat layer and it is transferred to the magnetic layer by contacting when it is wound up from the back-coat layer. Therefore, uneven coating is less likely to occur than in direct coating on the magnetic layer or the protective film, and deposition of the lubricant is also less likely to occur. As a result, much more different types of lubricants can be used.

The back-coat layer comprises non-magnetic powder and a binder resin. As the non-magnetic powder, various types of inorganic pigment or carbon black may be used. As the binder resin, various substances used as the binder resin for coating type magnetic layers such as nitrocellulose, phenoxy resin, vinyl chloride resin, polyurethane, etc. may be used.

The coating quantity of the lubricant differs according to surface roughness, surface element and surface conditions of the magnetic recording medium. In general, it is preferably 0.5 to 50 mg/m$^2$, or more preferably 1 to 20 mg/m$^2$. If the coating quantity is too low, lubricating property is not good, and it leads to poor still durability and CSS durability. Friction coefficient may be increased due to repeated sliding, and when it is run on VTR, running is stopped. On the other hand, if the coating quantity is too much, static friction coefficient is increased, and running is hindered on VTR or disk device. In case of a disk medium, it is stuck on the magnetic head, resulting in head crushing.

In the magnetic recording medium of the present invention, a protective film may be provided on the ferromagnetic metal thin film, and running durability and corrosion-resistant property can be improved by this protective film.

As the protective film, oxides such as silica, alumina, titania, zirconia, cobalt oxide, nickel oxide, etc., nitrides such as titanium nitride, silicon nitride, boron nitride, etc., carbides such as silicon carbide, chromium carbide, boron carbide, etc., and carbons such as graphite, amorphous carbon may be used.

These protective films can be manufactured by vacuum evaporation method, sputtering method, CVD method, sol-gel method, or thermal decomposition method of organic compounds of metal.

Specifically, to the protective effect of the protective film, the effect of the lubricating layer of the present invention is added, and this makes it possible to produce a magnetic recording medium, which can endure the sliding operation with the magnetic head under severe conditions and in which surface lubricating property can be maintained for long time without wearing the surface of the medium.

Therefore, as the protective film, it is preferable to use a film having hardness equal to or higher than that of head material. More preferably, the film is not easily seized during sliding and has stable and lasting effect. As such a protective film, hard carbon film may be used.

The hard carbon film is carbon film of amorphous, graphite or diamond structures produced by plasma CVD method, sputtering method, etc. or a mixture of these substances, and more preferably it is a hard carbon film generally called as diamond-like carbon. This carbon film has Vickers hardness of 1000 kg/mm$^2$ or higher, or more preferably 2000 kg/mm$^2$ or higher. Its crystal structure is amorphous, and it is electrically not conductive. When the structure of the diamond-like carbon film of the present invention is determined by Raman spectroscopic analysis, the peak is detected at 1520 to 1560$^{-1}$ cm. When the structure of carbon film is deviated from the diamond-like structure, the peak detected by Raman spectroscopic analysis is deviated from the above range. At the same time, the hardness of the carbon film is also decreased, and it is difficult to attain the object of the present invention.

The structure of the diamond-like carbon film of the present invention can also be identified by X-ray electron spectroscopy (ESCA) in addition to Raman spectroscopic analysis. In particular, when identified by ESCA, the better carbon film can be obtained if plasmon loss energy of C-1s is 26±1 eV. The plasmon loss energy as mentioned here is determined by an X-ray electron spectroscopic system (e.g. Perkin-Elmer; PHI-560), which irradiates X-ray on carbon film and determines the deviation caused by plasmon loss from the main peak of C-1s spectrum. When the hardness of the carbon protective film is decreased, friction property is improved while wear resistance is decreased, and the running durability cannot be obtained as desired. In particular, still durability is extensively decreased. These diamond-like carbon protective films can be produced by sputtering method or CVD method, while it is preferable to produce it by CVD method because of productivity and stable quality and also because high wear-resistant property can be maintained even in ultra-thin film of 10 nm or less in thickness. Particularly, it is preferable that chemical species decomposed by high frequency plasma is accelerated by applying bias voltage on the magnetic recording medium.

There is no special restriction on the plasmatized carbon compound used as the material for the carbon protective film, and compounds of hydrocarbon type, ketone type or alcohol type may be used.

In particular, it is preferable to produce the hard carbon protective film by plasma CVD method using raw materials such as carbon-containing compounds including alkanes such as methane, ethane, propane, butane, etc., alkenes such as ethylene, propylene, etc., or alkynes such as acetylene.

These materials for forming the film are introduced into a plasma generator at partial pressure of 13.3 to 0.133 N/m$^2$, or more preferably 6.67 to 2.67 N/m$^2$. In addition to gas of the above raw materials, hydrogen or inert gas such as argon may be introduced at the same time. In this case, hydrocarbons such as methane, acetylene, etc. or argon is preferably used as a mixed gas. The mixing ratio is preferably as follows: hydrocarbon: argon=6:1 to 2:1.

If the hard carbon protective film is too thick, problems may occur such as deterioration of electromagnetic transfer characteristics or poor fitness on the magnetic layer. If the film is too thin, wear-resistant property is lowered. Thus, the film thickness is preferably 2.5 to 20 nm, or more preferably 5 to 10 nm.

Also, with the purpose of further improving the fitness with the lubricant to be provided on the hard carbon protective film, the surface of the hard carbon protective film may be treated with oxidizing gas or inert gas.

The ferromagnetic metal thin film used as the magnetic layer in the magnetic recording medium of the present invention is produced by vacuum evaporation method, ion plating method, sputtering method, CVD method, etc. The film is formed in single layer, parallel multiple layer, non-parallel multiple layer, etc. As the metal materials, cobalt alloy such as cobalt-nickel alloy, cobalt-chromium alloy, cobalt-platinum alloy, iron-cobalt alloy, etc. may be used in addition to the metals such as iron, cobalt, nickel, etc.

In case the ferromagnetic metal thin film is prepared by vacuum diagonal evaporation method in a small quantity of oxygen atmosphere, it is preferable to use Co—O or Co—Fe containing Co—O, in which 90% or more of metal atoms constituting the magnetic layer is cobalt, in order that electromagnetic transfer characteristics can be improved. Also, it is preferable that 95% or more of the metal atoms is cobalt, or more preferably 97% or more. The thickness of the magnetic layer is preferably 100 to 300 nm, or more preferably 120 to 200 nm.

The ferromagnetic metal thin film may be prepared in multiple layer to improve the electromagnetic transfer characteristics or may contain non-magnetic underlayer or intermediate layer.

The ferromagnetic metal thin film, in which most of the metal atoms of the magnetic layer are cobalt, has high magnetic property, but it has poor weather-resistant property and has also problems in running property and durability. However, if the lubricant layer as disclosed by the present invention is used, it is possible to obtain a magnetic recording medium, which has good corrosion-resistant property, running property and durability even when 90% or more of the layer is cobalt.

When ferromagnetic metal thin film is produced by sputtering method, the magnetic layer is preferably made of a Co—Cr—(—X) alloy to have better electromagnetic transfer characteristics, or more preferably, Co—Cr—Ta or Co—Cr—Pt. The thickness of the magnetic layer is preferably 100 nm or less, or more preferably 10 to 30 nm.

In this case again, the ferromagnetic metal thin film may be in multiple layer or may contain an underlayer or an intermediate layer. The underlayer is preferably made of Cr or Cr—Ti. The thickness of the underlayer is preferably 10 to 500 nm.

As the non-magnetic support member used in the present invention, plastic film may be used in case of a flexible medium, and glass substrate or aluminum substrate may be used in case of rigid medium. In particular, it is preferable to use film of polyethyleneterephthalate, polyimide, polyamide, polyamideimide, etc. of 3 to 10 μm in thickness in case of a tape-like medium, and the film of 20 to 100 μm in thickness in case of a floppy disk type medium. To improve the running property, it is preferable to use the film with an inorganic filler of 5 to 30 nm in particle size on the surface. Also, the film having the filler inside the non-magnetic support member and non-magnetic support member with irregular surface may be used.

In case of a tape-like medium, the running property and durability of the magnetic recording medium of the present invention can be improved by providing a back-coat layer having coating film, which contains non-magnetic powder and binder resin as principal component on the surface opposite to the surface of the non-magnetic support member where the magnetic layer is formed. Ferromagnetic metal thin film has very little lubricant on its surface or inside, and it is advantageous in that the lubricant is provided in advance in the back-coat layer because the lubricant can be supplied from the back-coat layer if it is in shortage. That is, by bringing the back-coat layer and the magnetic layer into contact with each other when the tape-like magnetic recording medium is in wound state, the lubricant is supplied to the magnetic layer, and it is possible to give its effect to a great extent.

As non-magnetic powder of the back-coat layer, various types of inorganic pigment or carbon black can be used. As the binder resin, various substances used as the binder resin for coating type magnetic layer such as nitrocellulose, vinyl chloride resin, polyurethane, etc. may be used.

As the lubricant compound in the magnetic recording medium of the present invention, carboxylic acid ester containing perfluoropolyether, hydrocarbon containing fluoroalkyl group, phosphoric acid esters, or phosphorous acid esters, may be simultaneously used.

As the perfluoropolyether used in the present invention, compound having perfluoropolyether chain such as perfluoromethyleneoxide, perfluoroethyleneoxide polymer, perfluoro-n-propyleneoxide polymer $(CF_2CF_2CF_2O)_n$, perfluoroisopropyleneoxide polymer $(CF(CF_3)CF_2O)_n$, etc. or copolymer of these substances may be used, and these substances may contain polar group such as alcohol, methylester group, etc. More concretely, KRYTOX 143AZ, 157SL (DuPont) or FOMBLINZ-DOL, Z-DEAL, AM2001, etc. (Montefluos) may be used.

Further, as the perfluoropolyethers, an ester of perfluoropolyether and hydrocarbon having the following structure may be used, and this is preferably used because of its solubility in organic solvents:

Rf—COO—R or

R—COO—CH$_2$—Rf where Rf represents a perfluoropolyether group having molecular weight of 1,000 to 3,000, and R represents a hydrocarbon group having 8 to 26 carbon atoms. Rf is a perfluoropolyether chain as described above.

As the ester containing fluoroalkyl group in the present invention, an ester expressed by the following formula may be used:

R$^1$—COO—R$^2$ where R$^1$ and R$^2$ each represents a saturated hydrocarbon group having 8 to 26 carbon atoms, or a hydrocarbon fluoride group with a part or all of hydrogen atoms substituted by fluorine atoms. R$^3$ and R$^4$ may be the same or different, and at least one of them contains fluorine atom. As such a fluoroalkyl group carboxylic acid ester, the following fluorine type esters may be used:

C$_8$F$_{17}$COOC$_{18}$H$_{37}$

C$_8$F$_{17}$(CH$_2$)$_2$COOC$_{18}$H$_{37}$

C$_{17}$F$_{35}$COO(CH$_2$)$_2$C$_8$F$_{17}$

C$_{17}$F$_{88}$COO(CH$_2$)$_2$C$_8$F$_{17}$

C$_{17}$F$_{31}$COO(CH$_2$)$_2$C$_8$F$_{17}$

C$_8$F$_{17}$(CH$_2$)$_{10}$COO(CH$_2$)$_{10}$C$_8$F$_{17}$

Or, the substance expressed by the following formula may be used:

R$^3$—COO—(R$^5$O)$_n$—R$^4$ where R$^5$ represents an alkylene group having 1 to 3 carbon atoms. R$^3$ represents a hydrocarbon group having 8 to 26 carbon atoms. R$^4$ represents a hydrocarbon group having 8 to 26 carbon atoms, or a hydrocarbon fluoride group with a part or all of hydrogen atoms substituted by fluorine atoms. More concretely, the following substances may be used.

C$_8$F$_{17}$COO(CH$_2$CH$_2$O)$_2$C$_{12}$H$_{25}$

C$_5$F$_{13}$C$_8$H$_{16}$COO(CH$_2$CH$_2$O)$_6$C$_2$H$_4$C$_4$F$_9$

C$_8$F$_{17}$C$_{14}$H$_{29}$COO(C$_6$H$_{12}$O)C$_8$H$_{17}$

C$_8$F$_{17}$COO(C$_4$H$_8$O)C$_4$H$_8$CH(CH$_3$)C$_8$H$_{17}$ (CH$_3$)$_2$CFC$_{10}$H$_{20}$COO(C$_6$H$_{12}$O)$_4$C$_{14}$H$_{29}$

C$_8$F$_{17}$C$_2$H$_4$COO(C$_8$H$_{18}$O)$_2$C$_5$H$_{10}$CF(CF$_3$)$_2$

In the present invention, it is also possible to use a hydrocarbon fluoride compound, which is obtained by substituting a part of hydrogen atoms of a hydrocarbon having no adsorptive function group by fluorine atoms. In so doing, it is possible to further improve running durability under low temperature and low humidity conditions. This hydrocarbon fluoride has preferably 14 to 40 carbon atoms, or more preferably 16 to 28 carbon atoms, or most preferably 18 to 24 carbon atoms. If it contains too many carbon atoms, crystalline property increases, thus leading to lower still durability or poor repeated running durability. If the number of carbon atoms is too few, volatility increases, resulting in deterioration of the properties over time. More concretely, the following substances may be used:

CF$_3$(CF$_2$)$_9$(CH$_2$)$_{15}$CH$_3$, CF$_8$(CF$_2$)$_7$(CH$_2$)$_{17}$CH$_8$,
CF$_8$(CF$_2$)$_7$(CH$_2$)$_8$(CF$_2$)$_7$CF$_3$, (CF$_8$)$_2$CF(CF$_2$)$_4$(CH$_2$)$_{15}$CH$_3$,
(CF$_8$)$_8$CF(CF$_2$)$_4$(CH$_2$)$_8$(CF$_2$)$_4$CF(CF$_8$)$_2$

In case the other lubricants are simultaneously used, it may be mixed with a salt of perfluoropolyether modified with phosphoric acid at terminal and alkylamine or may be used separately by the same procedure.

The magnetic recording medium of the present invention has high corrosion-resistant property, and the corrosion-resistant property can be increased when a heterocyclic rust preventive agent is used. As the rust preventive agents used for the present invention, heterocyclic compounds containing nitrogen such as benzotriazole, benzimidazole, purine, pyrimidine, etc. or their derivatives having alkyl side chain in nucleus, or heterocyclic compound containing nitrogen and sulfur such as benzothiazole, 2-mercaptobenzothiazole, tetrazaindene ring compound, thiouracil compound or their derivatives may be used.

As the tetrazaindene ring compound usable for this purpose, the compound expressed by the following formula may be used:

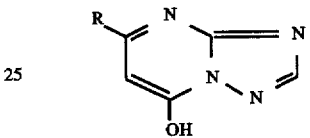

where R represents a hydrocarbon group selected from alkyl group, alkoxyl group, or alkylamide group.

Preferably, it contains 3 to 20 carbon atoms. In case of alkoxyl group, R in ROCOCH$_2$— represents C$_3$H$_7$— or C$_6$H$_{13}$— or phenyl. In case of alkyl group, R represents C$_6$H$_{13}$—, C$_9$H$_{19}$—, or C$_{17}$H$_{35}$—. In case of alkylamide group, R in RNHCOCH$_2$— represents a phenyl group or C$_3$H$_7$—.

As the thiouracil ring compound, the compound expressed by the following formula may be used:

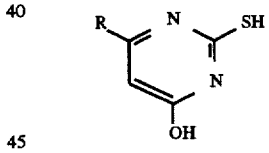

where R represents a hydrocarbon group having 3 or more carbon atoms..

It is preferable to coat the rust preventive agent by 0.01 to 5.0 mg/m$^2$ to 1.0 to 50 mg/m$^2$ of the lubricant, or more preferably by 0.1 to 10 mg/m$^2$ to 3 to 30 mg/m$^2$ of the lubricant.

In the magnetic recording medium of the present invention, the salt of perfluoropolyether modified with phosphoric acid at terminal and alkylamine compound is very easily adsorbed to the magnetic layer or the protective film, and it is also adsorbed to hydrophobic surface such as carbon film, and this provides high boundary lubrication property and corrosion-resistant property. Because phosphoric acid group is contained in the molecule, extreme-pressure lubrication can be achieved due to decomposition of the lubricant under severe sliding conditions, and high durability can be provided to still and scratching. Compared with the case where perfluoropolyether modified with phosphoric acid at terminal is used, running durability is not decreased after being stored at high temperature and high humidity conditions, and high reliability can be assured. At the same time, it is possible to solubilize in organic solvents. The high preservation property may owe to the fact that, even when phosphoric acid group is hydrolyzed under high temperature and high humidity conditions, the alkylamine compound is not decomposed and contributes to lubrication.

In the following, description will be given on several examples and comparative examples of the present invention to facilitate explanation of the invention.

[Examples 1 to 20 and Comparative Examples 1 to 7]

On a polyethyleneterephthalate film of 10 μm in thickness having a spherical filler made of silica with particle size of 13 nm on its surface, cobalt was deposited twice by diagonal evaporation in thickness of 70 nm under oxygen-containing atmosphere so that incident angle of magnetic metal vapor stream to the polyethyleneterephthalate film was 45°. As a result, a ferromagnetic metal film of two-layer construction of 140 nm in total thickness was prepared. It was prepared in such manner that the inclination of columnar crystal of magnetic metal of thin film is identical in two layers. Then, heat treatment was performed, and after correcting curl, a carbon protective film was formed by plasma CVD method as given below on the magnetic layer.

Methane was supplied at flow rate of 150 sccm as raw material, and argon was supplied as carrier gas at flow rate of 50 sccm. High frequency electric power of 600 W was supplied, and DC voltage of −400 V was applied on the surface of the magnetic layer via a pass roller. DC voltage of +500 V was applied on an anode at gas introducing portion. The generated plasma was accelerated, and a hard carbon protective film consisting of diamond-like carbon was formed on the surface of the magnetic layer at 20° C. with carrier velocity of 5 m/min.

The carbon protective film thus obtained was 8 nm in thickness and it was confirmed by Raman spectroscopic analysis that the carbon protective film was a diamond-like carbon. The protective film separately prepared by the same procedure had Vickers hardness of 2,200 kg/mm$^2$.

Further, coating solution for a back-coat layer having the following composition was coated on the surface opposite to the side of the polyethyleneterephthalate film where magnetic layer is formed, and a back-coat layer of 0.5 μm in thickness was formed.

| (Coating solution for the back-coat layer) | |
| --- | --- |
| Carbon black N-990 (Cancalb; Average particle size 270 nm) | 3 weight parts |
| Black Pearl 800 (Cabot; Average particle size 17 nm) | 97 weight parts |
| Nitrocellulose (Daicel; RS1/2H) | 60 weight parts |
| Polyurethane (Nippon Polyurethane; N-2304) | 60 weight parts |
| Polyisocyanate (Nippon Polyurethane; Coronate L) | 20 weight parts |
| Methylethylketone | 1000 weight parts |

Next, a salt of of perfluoropolyether modified with phosphoric acid group at terminal and alkylamine shown in Table 1 was dissolved respectively in the solvents given in Table 1, and this was coated on the carbon protective film using wire bar and was dried. Each product was cut to 8 mm in width and was incorporated in a cassette for 8 mm VTR and was used as the specimen.

[Synthesis example of the compound]

The method to synthesize the lubricants used for Example 2 was as follows: Into a mixed solution containing flon 113 and ethyl acetate, 0.03 mol of perfluoropolyether modified with hydroxyl group at terminal $F(CF_2CF_2CF_2O)_{10}CF_2CF_2CF_2OH$ (Daikin; Demnam SA) and 0.3 mol of phosphoryl chloride were dissolved. This solution was heated at 40° C. for 13 hours while stirring, and 10 mol of pure water was dropped to hydrolyze. When the generated reaction product was analyzed by $^{31}$P-NMR, it was found that mono-compound was principal component, and di-compound was mingled with it to some extent. The perfluoropolyether modified with phosphoric acid at terminal and octadecylamine were mixed together at mol ratio of 1:1 and was heated and allowed to react at 100° C. in nitrogen atmosphere, and the compound was obtained as desired.

The other lubricants can be produced by the same procedure, changing perfluoropolyether and amine as raw materials.

TABLE 1

| Specimen | Lubricants | Solvents | Coating q'ty (mg/m$^2$) |
| --- | --- | --- | --- |
| Example 1 | $F(CF(CF_3)CF_2O)_{10}CF(CF_3)CH_2OPO_3H.H_3N(CH_2)_{17}CH_3$ | Methanol | 1 |
| 2 | $F(CF(CF_3)CF_2O)_{10}CF(CF_3)CH_2OPO_3H.H_3N(CH_2)_{17}CH_3$ | Methanol | 5 |
| 3 | $F(CF(CF_3)CF_2O)_{10}CF(CF_3)CH_2OPO_3H.H_3N(CH_2)_{17}CH_3$ | Methanol | 10 |
| 4 | $F(CF(CF_3)CF_2O)_{10}CF(CF_3)CH_2OPO_3H.H_3N(CH_2)_{17}CH_3$ | Methanol | 20 |
| 5 | $F(CF(CF_3)CF_2O)_{26}CF(CF_3)CH_2OPO_3H.H_3N(CH_2)_{17}CH_3$ | Methanol | 30 |
| 6 | $F(CF(CF_3)CF_2O)_{26}CF(CF_3)CH_2OPO_3H.H_3N(CH_2)_{17}CH_3$ | HCFC225 | 5 |
| 7 | $F(CF(CF_3)CF_2O)_{10}CF(CF_3)CH_2OPO_3H.H_3N(CH_2)_{17}CH_3$ | HCFC225 | 5 |
| 8 | $F(CF(CF_3)CF_2O)_{10}CF(CF_3)CH_2OPO_3H.H_3N(CH_2)_{23}CH_3$ | HCFC225 | 5 |
| 9 | $F(CF(CF_3)CF_2O)_{10}CF(CF_3)CH_2OPO_3H.H_3N(CH_2)_{11}CH_3$ | HCFC225 | 5 |
| 10 | $F(CF(CF_3)CF_2O)_{10}CF(CF_3)CH_2OPO_3H.H_3N(CH_2)_7CH_3$ | HCFC225 | 5 |
| 11 | $F(CF(CF_3)CF_2O)_{10}CF(CF_3)CH_2OPO_3H.H_3N(CH_2)_3CH_3$ | HCFC225 | 5 |
| 12 | $F(CF(CF_3)CF_2O)_{10}CF(CF_3)CH_2OPO_3H.H_2N((CH_2)_{17}CH_3)_2$ | Methanol | 5 |
| 13 | $F(CF(CF_3)CF_2O)_{10}CF(CF_3)CH_2OPO_3H.HN((CH_2)_{17}CH_3)_3$ | Methanol | 5 |
| 14 | $F(CF(CF_3)CF_2O)_{10}CF(CF_3)CH_2OPO_3H.(CH_3)H_2N(CH_2)_{17}CH_3$ | Methanol | 5 |
| 15 | $F(CF(CF_3)CF_2O)_{10}CF(CF_3)CH_2OPO_3H.(CH_3)2HN(CH_2)_{17}CH_3$ | Methanol | 5 |
| 16 | $F(CF(CF_3)CF_2O)_{10}CF(CF_3)CH_2OPO_3H.(CH_3) 3N(CH_2)_{17}CH_3$ | Methanol | 5 |
| 17 | $F(CF_2CF_2F_2O)_{10}CF_2CH_2OPO_3H.H_3 N(CH_2)_{17}CH_3$ | Methanol | 5 |
| 18 | $F(CF_2CF_2F_2O)_{10}CF_2CH_2CH_2OPO_{3.(CH_3} N(CH_2)_{17}CH_3)_2$ | Methanol | 5 |
| 19 | $F(CF_2CF_2F_2O)_{10}CF_2CH_2CH_2OPO_3H.H_3N(CH_2)_{10}$ | HCFC225 | 5 |

TABLE 1-continued

| Specimen | Lubricants | Solvents | Coating q'ty (mg/m²) |
|---|---|---|---|
| 20 | $NH_3 \cdot HO_3POCH_2CF_2(OCF_2CF_2CF_2)_{10}F$<br>$CH_3(CH_2)_{17}NH_3 \cdot HO_3POCH_2$<br>$CF_2O(CF_2CF_2O)_m(CF_2O)_n$<br>$CF_2CH_2OPO_3H \cdot H_3N(CH_2)_{17}CH_3$ | Methanol | 5 |
| Comparative Example 1 | $F(CF_2CF_2CF_2O)_{10}CH_2OH$ | HCFC225 | 5 |
| 2 | $HOOC(CF_2CF_2O)_m(CF_2O)_nCOOH$ | HCFC225 | 5 |
| 3 | $F(CF(CF_3)CF_2O)_{10}COO(CH_2)_{17}CH_3$ | Methanol | 5 |
| 4 | $F(CF(CF_3)CF_2O)_{10}COO \cdot H_3N(CH_2)_{17}CH_3$ | Methanol | 5 |
| 5 | $CH_3(CH_2)_{17}OCO(CF_2CF_2O)_m(CF_2O)_nCOO(CH_2)_{17}CH_3$ | Methanol | 5 |
| 6 | $(CF_2CF_2O)_{10}CH_2OPO_3H_2$ | HCFC225 | 5 |
| 7 | $CH_3(CH_2)_{17}NH_2$ | Methanol | 2 |

In the compounds of Example 20, Comparative Examples 2 and 5, molecular weight of perfluoropolyether was about 2,000.

On the specimens of magnetic recording medium thus obtained, still durability, repeated running durability, and corrosion-resistant property were determined under the following conditions. The results are summarized in Table 2.

[Evaluation method]

1. Determination of friction coefficient (μ value)

Under the conditions of 23° C. and 70% relative humidity, a magnetic recording medium and a stainless steel bar (SU 420J) were wound together at tensile force ($T_1$) of 20 g and were brought into contact at an angle of 180°. The tensile force ($T_2$) required for running the magnetic tape at 3.3 cm/sec. was measured, and friction coefficient μ of the magnetic tape was calculated according to the following equation:

$$\mu = 1/\pi \cdot \ln(T_2/T_1)$$

2. Determination of still durability (Condition A)

Under the conditions of 23° C. and 10% relative humidity, a color bar image was recorded at running tension of 20 g using an 8 mm VTR (Fuji Photo Film Co., Ltd.; FUJIX-M6), and the image was reproduced under still condition without operating still restriction mechanism, and the time until output reaches initial value of −6 dB was measured and evaluated.

(Condition B)

Under the condition of −10° C., a color bar signal was recorded on a commercially available 8 mm VTR (Fuji Photo Film Co., Ltd.: FUJIX V-88) and was reproduced. Then, the image was reproduced under still condition without operating still restriction mechanism, and the time until output reaches initial value of −6 dB was measured and evaluated.

(Condition C)

Under the condition of 5° C. and 10% relative humidity, a color bar signal was recorded with the cylinder of recording head rotated at twice as many revolutions as normal revolutions using an 8 mm VTR (Sony Corporation; EV-S700) and was reproduced. Then, the image was reproduced under still condition without operating still restriction mechanism, and the time until output reaches initial value of −6 dB was measured and evaluated.

3. Repeated running durability

Under the conditions of 23° C. and 10% relative humidity, a single wave signal of 7.6 MHz was recorded for 60 minutes using an 8 mm VTR (Sony Corporation; EV-S1500). Then, this was repeatedly reproduced for 100 times, and the change of output and head contamination after 100 operations were evaluated. Head contamination was evaluated as follows: "Very good" when no contamination was found on both sliding portion and non-sliding portion; "no good" when distinct contamination was found on sliding portion; "good" when the conditions did not fall under the above two categories.

4. Corrosion-resistant property (Condition A)

Under the conditions of 27° C. and 80% relative humidity, the surface of the magnetic recording medium was exposed to an environmental condition with sulfur dioxide gas at 1 ppm for 72 hours. Then, tape surface was visually inspected, and the results were evaluated as follows: "Very good" when there was no substantial change from the pre-test condition; "good" when metallic luster remained on the entire surface of the tape but corrosion was observed; and "no good" when a part or all of the magnetic layer was corroded and dissolved.

(Condition B)

The surface of the magnetic recording medium was exposed to the conditions of 60° C. and 90% relative humidity for one week. Then, friction coefficient was determined by the same procedure as in the condition A above.

TABLE 2

| Specimen | μ value | Still durability (min) | | | Running durability | | Corrosion-resistant (visual) | μ value after storage |
|---|---|---|---|---|---|---|---|---|
| | | Condition A | Condition B | Condition C | Output change (dB) | Head contamination | | |
| Example 1 | 0.29 | 39 | 25 | 26 | −0.3 | Very good | Good | 0.35 |
| 2 | 0.23 | >120 | >120 | >120 | −0.8 | Very good | Very good | 0.25 |
| 3 | 0.24 | >120 | >120 | >120 | −0.9 | Very good | Very good | 0.27 |
| 4 | 0.27 | >120 | >120 | >120 | −1.2 | Very good | Very good | 0.3 |
| 5 | 0.3 | >120 | >120 | >120 | −1.1 | Very good | Good | 0.32 |

TABLE 2-continued

| Specimen | μ value | Still durability (min) | | | Running durability | | Corrosion-resistant (visual) | μ value after storage |
|---|---|---|---|---|---|---|---|---|
| | | Condition A | Condition B | Condition C | Output change (dB) | Head contamination | | |
| 6 | 0.27 | >120 | >120 | >120 | −1.5 | Very good | Good | 0.29 |
| 7 | 0.32 | >120 | >120 | >120 | −1.6 | Very good | Good | 0.34 |
| 8 | 0.27 | >120 | >120 | >120 | −1.1 | Very good | Very good | 0.26 |
| 9 | 0.25 | >120 | >120 | >120 | −0.2 | Very good | Very good | 0.27 |
| 10 | 0.28 | >120 | >120 | >120 | −0.2 | Very good | Good | 0.31 |
| 11 | 0.3 | >120 | >120 | >120 | −0.2 | Very good | Good | 0.33 |
| 12 | 0.25 | >120 | >120 | >120 | −1.9 | Very good | Very good | 0.27 |
| 13 | 0.26 | >120 | >120 | >120 | −2 | Very good | Good | 0.28 |
| 14 | 0.24 | >120 | >120 | >120 | −0.9 | Very good | Very good | 0.27 |
| 15 | 0.24 | >120 | >120 | >120 | −0.5 | Very good | Very good | 0.26 |
| 16 | 0.27 | >120 | >120 | >120 | −1.3 | Very good | Good | 0.29 |
| 17 | 0.23 | >120 | >120 | >120 | −1 | Very good | Very good | 0.25 |
| 18 | 0.26 | >120 | >120 | >120 | −1.8 | Very good | Good | 0.3 |
| 19 | 0.3 | >120 | >120 | >120 | −0.7 | Very good | Good | 0.32 |
| 20 | 0.23 | >120 | >120 | >120 | −0.2 | Very good | Very good | 0.25 |
| Comparative Example 1 | 0.39 | 28 | 25 | 5 | 0.5 | Very good | No good | 0.45 |
| 2 | 0.31 | 15 | 16 | 4 | 0.4 | Very good | No good | 0.35 |
| 3 | 0.26 | >120 | 55 | 32 | −1.1 | Very good | No good | 0.33 |
| 4 | 0.26 | 23 | 10 | 4 | −1.5 | Very good | No good | 0.28 |
| 5 | 0.24 | 44 | 25 | 8 | −0.9 | Very good | No good | 0.29 |
| 6 | 0.29 | >120 | >120 | 62 | −1.1 | Very good | Good | 0.38 |
| 7 | 0.33 | 5 | 2 | 2 | <−6 | No good | No good | 0.37 |

As a result, it was possible to obtain a protective layer, which showed high-grade preservation property, running property and durability not attainable by conventional type lubricants, and a high density magnetic recording medium could be obtained. The salt of a compound containing perfluoropolyether modified with phosphoric acid at terminal and an alkylamine compound, as used as lubricant in the present invention, is easily adsorbed on the magnetic layer or the protective film, and it is also adsorbed on hydrophobic surface such as carbon film much easier than the conventional type lubricants, and high boundary lubrication property and corrosion-resistant property can be attained. Further, because phosphoric acid group is contained in the molecule, extreme-pressure lubrication can be accomplished due to decomposition of the lubricant under severe sliding condition, and this results in high durability such as still property and CSS property. Further, compared with the case where perfluoropolyether modified with phosphoric acid at terminal is used alone, running durability is not decreased after it has been stored at high temperature and high humidity conditions, and high reliability is assured.

What we claim are:

1. A magnetic recording medium, comprising a magnetic film, the magnetic film comprising a non-magnetic support member having a ferromagnetic metal thin film on one side thereof, and a protective film laminated thereupon, whereby an alkylamine salt of a perfluoropolyether compound containing a phosphoric acid group at a molecular terminal thereof is present on a surface of the protective film, and wherein the salt of the alkylamine perfluoropolyether compound is present in an amount of from 1 to 30 mg/m² and has one of the following chemical formulae (1) to (4):

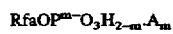  (1)

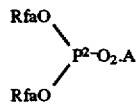  (2)

RfaOP$^{m-}$O$_3$H.B.HO$_3$PORfa  (3)

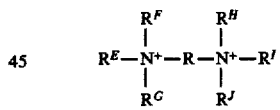  (4)

where A represents:

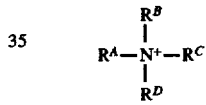

wherein R$^A$, R$^B$, R$^C$ and R$^D$ each represents a hydrogen atom, a hydrocarbon group or a hydrocarbon fluoride group having 1 to 26 carbon atoms, and B represents:

$$R^E-N^+-R-N^+-R^I$$
with R$^F$, R$^H$ substituents on the nitrogens and R$^G$, R$^J$ substituents on the nitrogens where R$^E$, R$^F$, R$^G$, R$^H$, R$^I$ and R$^J$ each represents a hydrogen atom or a hydrocarbon or a hydrocarbon fluoride group having 1 to 26 carbon atoms, and R represents an alkylene group having 1 to 26 carbon atoms;

m represents 1 or 2;

Rfa represents a monovalent perfluoropolyether group having an alkylene group at one terminal thereof; and Rfb represents a bivalent perfluoropolyether group having alkylene groups at both terminals thereof.

2. The magnetic recording medium of claim 1, wherein the protective film comprises a material selected from the group consisting of silica, alumina, titania, zirconia, cobalt oxide, nickel oxide, titanium nitride, silicon nitride, boron nitride, silicon carbide, chromium carbide, boron carbide, graphite and amorphous carbon.

* * * * *